United States Patent
Pirker et al.

(10) Patent No.: US 10,428,656 B2
(45) Date of Patent: Oct. 1, 2019

(54) GAS TURBINE

(71) Applicant: MTU Aero Engines AG, Munich (DE)

(72) Inventors: Klaus Pirker, St. Lambert (CA); Christoph Lauer, Munich (DE)

(73) Assignee: MTU Aero Engines AG, Munich (DE)

( * ) Notice: Subject to any disclaimer, the term of this patent is extended or adjusted under 35 U.S.C. 154(b) by 524 days.

(21) Appl. No.: 15/213,989

(22) Filed: Jul. 19, 2016

(65) Prior Publication Data
US 2017/0030196 A1 Feb. 2, 2017

(30) Foreign Application Priority Data

Jul. 28, 2015 (EP) .................... 15178652

(51) Int. Cl.
F01D 5/08 (2006.01)
F01D 5/06 (2006.01)

(52) U.S. Cl.
CPC ............... F01D 5/081 (2013.01); F01D 5/06 (2013.01); F01D 5/082 (2013.01); F01D 5/084 (2013.01); F01D 5/085 (2013.01); F05D 2220/323 (2013.01); F05D 2260/20 (2013.01); Y02T 50/673 (2013.01); Y02T 50/676 (2013.01)

(58) Field of Classification Search
CPC . F01D 5/081; F01D 5/02; F01D 5/025; F01D 5/06; F01D 5/082; F01D 5/084; F01D 5/085; F01D 5/12; F01D 5/087; F02C 3/04; F02C 7/18; F05D 2220/323; F05D 2240/30; F05D 2260/20; Y02T 50/673; Y02T 50/676
USPC ........................................................ 415/115
See application file for complete search history.

(56) References Cited

U.S. PATENT DOCUMENTS

| | | | |
|---|---|---|---|
| 2,636,665 | A | 4/1953 | Lombard |
| 2,680,001 | A | 6/1954 | Batt |
| 2,830,751 | A | 4/1958 | Quinn et al. |

(Continued)

FOREIGN PATENT DOCUMENTS

| | | |
|---|---|---|
| EP | 1785588 A1 | 5/2007 |
| EP | 2011966 A2 | 1/2009 |
| WO | 2008141609 A2 | 11/2008 |

OTHER PUBLICATIONS

Machine Translation of European Search Report dated Jan. 20, 2016 (Year: 2016).*

Primary Examiner — Justin D Seabe
Assistant Examiner — Brian Christopher Delrue
(74) Attorney, Agent, or Firm — Barlow, Josephs & Holmes, Ltd.

(57) ABSTRACT

The present invention relates to a gas turbine, in particular an aircraft engine gas turbine having a shaft and a bladed turbine rotor joined therewith that has a first rotor segment which has a downstream rotating cascade of the turbine rotor and bounds a first space in the radial direction, this first space communicating with a first gas passage disposed in the shaft, and has a second rotor segment axially adjacent to the first rotor segment, which has at least one second rotating cascade of the turbine rotor and bounds in the radial direction a second space axially adjacent to the first space, this second space communicating with a second gas passage, wherein the first rotor segment has at least one first discharge opening for the discharge of gas from the first space upstream of the furthest downstream rotating cascade.

11 Claims, 1 Drawing Sheet

(56) References Cited

U.S. PATENT DOCUMENTS

| | | | | |
|---|---|---|---|---|
| 3,609,057 A * | 9/1971 | Radtke | F01D 5/081 | 415/115 |
| 3,703,081 A * | 11/1972 | Krebs | F01D 5/06 | 60/226.1 |
| 3,751,909 A | 8/1973 | Kohler | | |
| 3,814,539 A * | 6/1974 | Klompas | F01D 5/081 | 415/115 |
| 4,213,738 A * | 7/1980 | Williams | F01D 5/081 | 415/115 |
| 4,291,531 A * | 9/1981 | Campbell | F02C 7/18 | 60/39.511 |
| 4,541,775 A * | 9/1985 | Hovan | F01D 5/084 | 415/115 |
| 4,741,153 A * | 5/1988 | Hallinger | F01D 5/082 | 415/116 |
| 4,880,354 A | 11/1989 | Teranishi et al. | | |
| 4,910,958 A * | 3/1990 | Kreitmeier | F01D 5/081 | 415/117 |
| 5,003,773 A * | 4/1991 | Beckwith | F01D 5/082 | 415/116 |
| 5,232,339 A | 8/1993 | Plemmons et al. | | |
| 5,472,313 A * | 12/1995 | Quinones | F01D 5/082 | 415/115 |
| 5,695,319 A * | 12/1997 | Matsumoto | F01D 5/085 | 415/114 |
| 5,700,130 A * | 12/1997 | Barbot | F01D 5/081 | 415/115 |
| 5,758,487 A * | 6/1998 | Salt | F01D 5/084 | 415/114 |
| 5,984,636 A * | 11/1999 | Fahndrich | F01D 5/3015 | 415/178 |
| 6,227,801 B1 * | 5/2001 | Liu | F01D 5/082 | 29/889.2 |
| 6,267,553 B1 * | 7/2001 | Burge | F01D 5/06 | 415/115 |
| 7,192,245 B2 * | 3/2007 | Djeridane | F01D 5/082 | 415/115 |
| 8,388,303 B2 | 3/2013 | Weidmann et al. | | |
| 2001/0011452 A1 * | 8/2001 | Rau | F01D 5/081 | 60/805 |
| 2001/0046441 A1 * | 11/2001 | Mashey | F01D 5/06 | 416/96 R |
| 2003/0133803 A1 * | 7/2003 | Brault | F01D 5/06 | 416/204 R |
| 2005/0172642 A1 * | 8/2005 | Coulon | F01D 5/082 | 60/806 |
| 2005/0201859 A1 * | 9/2005 | Coulon | F01D 5/081 | 415/170.1 |
| 2005/0217277 A1 * | 10/2005 | Alvanos | F01D 5/081 | 60/782 |
| 2005/0268619 A1 * | 12/2005 | Ress, Jr. | F01D 5/082 | 60/782 |
| 2006/0213202 A1 * | 9/2006 | Fukutani | F01D 5/082 | 60/785 |
| 2007/0110562 A1 * | 5/2007 | Mons | B23H 9/10 | 415/110 |
| 2007/0157626 A1 * | 7/2007 | Bergholz | F01D 5/082 | 60/782 |
| 2010/0104418 A1 * | 4/2010 | Weidmann | F01D 5/025 | 415/111 |
| 2010/0196167 A1 * | 8/2010 | Ammann | F01D 5/082 | 416/97 R |
| 2010/0281879 A1 * | 11/2010 | Shapiro | F01D 5/08 | 60/782 |
| 2011/0088405 A1 * | 4/2011 | Turco | F01D 5/081 | 60/782 |
| 2011/0280735 A1 * | 11/2011 | Dakowski | F01D 5/082 | 416/97 R |
| 2012/0003103 A1 * | 1/2012 | Tholath | F01D 5/081 | 416/96 A |
| 2012/0060507 A1 * | 3/2012 | King | F01D 5/081 | 60/782 |
| 2012/0082568 A1 * | 4/2012 | Tibbott | F01D 5/081 | 416/97 R |
| 2012/0151936 A1 * | 6/2012 | Roussely-Rousseau | F01D 5/081 | 60/785 |
| 2012/0321452 A1 * | 12/2012 | Miranda | F01D 5/082 | 415/180 |
| 2014/0248122 A1 * | 9/2014 | Vetters | F01D 5/082 | 415/1 |
| 2014/0294597 A1 * | 10/2014 | Da Costa | F01D 5/081 | 416/96 R |
| 2015/0096304 A1 * | 4/2015 | von der Esch | F01D 5/06 | 60/796 |
| 2015/0121897 A1 * | 5/2015 | Ress, Jr. | F01D 5/081 | 60/804 |
| 2015/0345426 A1 * | 12/2015 | Houston | F02K 3/072 | 60/226.1 |
| 2015/0354455 A1 * | 12/2015 | Suciu | F02C 3/04 | 60/782 |
| 2016/0084165 A1 * | 3/2016 | Packard | B64D 33/10 | 60/782 |
| 2016/0090854 A1 * | 3/2016 | Webb | F01D 5/081 | 416/220 R |
| 2017/0009656 A1 * | 1/2017 | Vessot | F02K 3/06 | |
| 2017/0089263 A1 * | 3/2017 | Clegg | F01D 5/02 | |
| 2017/0241348 A1 * | 8/2017 | Wilshaw | F04D 29/644 | |
| 2017/0284411 A1 * | 10/2017 | Bentley | F04D 29/053 | |

* cited by examiner

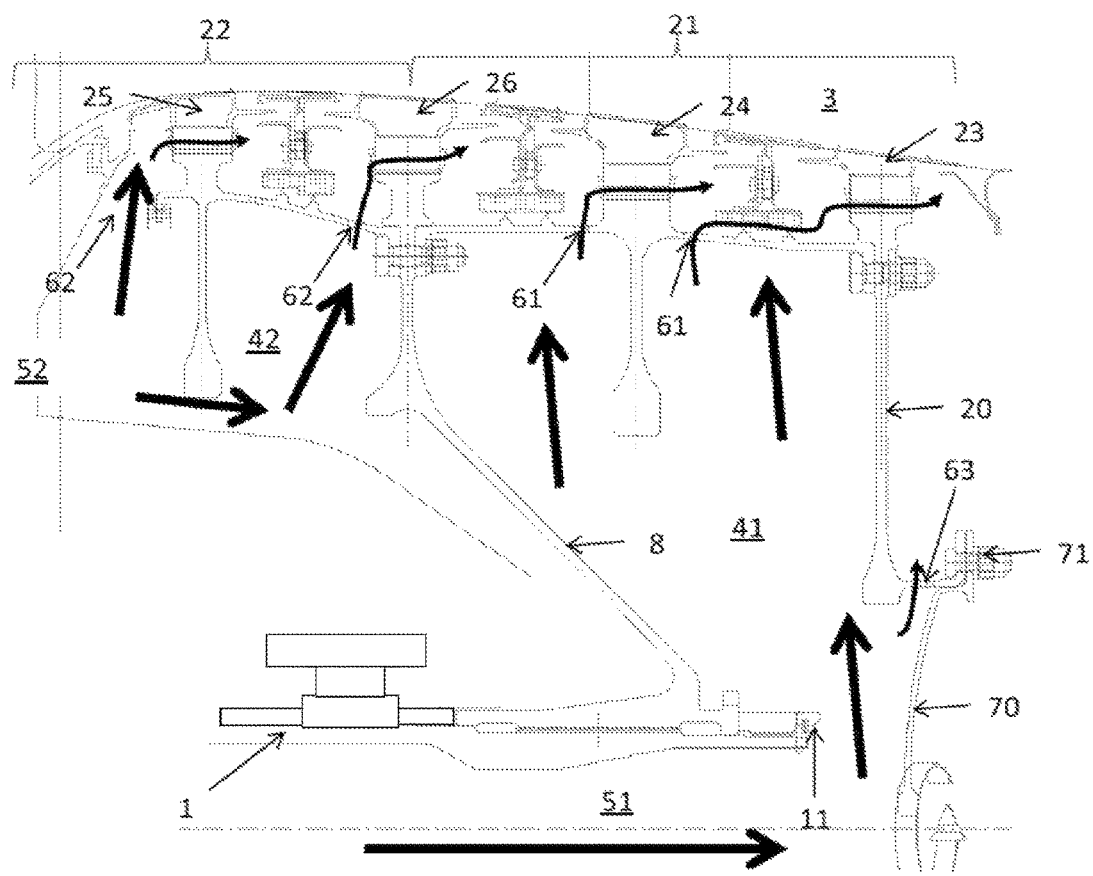

GAS TURBINE

BACKGROUND OF THE INVENTION

The present invention relates to a gas turbine, in particular an aircraft engine gas turbine, as well as a method for operating a gas turbine.

Known from our own WO 2008/141609 A2 is a gas turbine with a shaft and a bladed turbine rotor joined therewith, which has a first rotor segment that has a furthest downstream rotating cascade of the turbine rotor, and a second rotor segment axially adjacent to the first rotor segment, which has a second rotating cascade of the turbine rotor and bounds a second space in the radial direction, which is supplied with cooling air.

For such a gas turbine according to WO 2008/141609 A2, it is additionally known to blow out sealed air through a first gas passage disposed in the shaft downstream of the furthest downstream rotating cascade between the turbine rotor and the turbine discharge housing.

SUMMARY OF THE INVENTION

An object of one embodiment of the present invention is to improve a gas turbine or its operation.

This object is achieved by a gas turbine and method of the present invention. Advantageous embodiments of the invention are discussed in detail below.

According to one aspect of the present invention, a gas turbine, in particular, an aircraft engine gas turbine, has at least one shaft and a bladed turbine rotor joined therewith, in particular, one that is rotationally resistant and/or axially fixed.

In one embodiment, the turbine rotor is disposed downstream of a combustion chamber of the gas turbine and/or converts enthalpy of a working gas of the gas turbine into work, in particular, for driving at least one compressor stage and/or a fan of the gas turbine, or is provided or furnished for this purpose. In particular, it can be a low-pressure turbine rotor or a turbine rotor next to the gas turbine outlet or the furthest downstream turbine rotor.

In one embodiment, the turbine rotor has a first rotor segment that has on its side a rotating cascade of the bladed turbine rotor that is furthest downstream or a last or rearmost rotating cascade or a rotating cascade next to the turbine (rotor) outlet. In one embodiment, the first rotor segment also has one or more additional rotating cascades distanced in the axial direction, this or these rotating cascade(s) being disposed upstream of the furthest downstream rotating cascade.

In one embodiment, the turbine rotor has a second rotor segment adjacent axially upstream to the first rotor segment or bounding thereto, and this second rotor segment has in turn one or more second rotating cascades of the turbine rotor distanced in the axial direction.

The first and second rotor segments can be separated from one another or defined, in particular, by a common, third rotating cascade.

In one embodiment, one or more rotating cascade(s) of the bladed turbine rotor, in particular the one furthest downstream and/or one or more additional rotating cascade(s) of the first rotor segment and/or the second rotating cascade(s) of the second rotor segment and/or the third rotating cascade are disposed in a, particularly common, flow channel, that can be bounded or defined, in particular in the radial direction, radially inside, at least partially, by the turbine rotor, in particular, by platforms of its rotating cascade(s).

In one embodiment, the axial direction is parallel to an axis of rotation of the rotatably mounted shaft, the radial direction being correspondingly perpendicular thereto. The terms "furthest upstream/downstream" in particular refer to a (reference) direction of through-flow of the flow channel or of the rotating cascades from a gas turbine inlet or turbine rotor inlet to a gas turbine outlet or turbine rotor outlet. Correspondingly, in one embodiment, a downstream or downstream-disposed feature is a feature on the outlet side of a gas turbine or turbine rotor or closer to an outlet of the turbine rotor or the gas turbine in the axial direction; an upstream or upstream-disposed feature is correspondingly a feature on the inlet side of a gas turbine or turbine rotor or closer to an inlet of the turbine rotor or the gas turbine in the axial direction.

In one embodiment, the first rotor segment bounds or defines radially (from) outside a first space in the radial direction, this first space communicating or joined aerodynamically with a particularly shaped first gas passage, in particular, a first flow channel, which is disposed in the shaft.

In one embodiment, the second rotor segment bounds or defines (from) radially outside in the radial direction a second space, which is axially adjacent to the first space, this second space communicating or joined aerodynamically with a second gas passage, in particular, a second flow channel, this second gas passage being different from the first gas passage, particularly aerodynamically or separated structurally. In one embodiment, the second space is separated aerodynamically or structurally from the first space.

In one embodiment, the first rotor segment has one or more first outlet or discharge openings for the discharge of gas from the first space upstream of the furthest downstream rotating cascade, in particular, into the flow channel, in particular, for the discharge of gas from the first space upstream and/or downstream of one or more additional rotating cascade(s) of the first rotor segment and/or downstream of the third rotating cascade, in particular, between the furthest downstream rotating cascade and another rotating cascade of the first rotor segment that is axially adjacent to the furthest downstream rotating cascade, and/or between two axially adjacent additional rotating cascades of the first rotor segment, and/or between the third rotating cascade and the furthest downstream rotating cascade or an additional rotating cascade of the first rotor segment. The first outlet or discharge openings may be drilled holes, for example.

In this way, in one embodiment, advantageously, gas from the first gas passage, which can advantageously cool the shaft, can be introduced into the flow channel in front of the furthest downstream rotating cascade and can perform work there. Additionally or alternatively, in one embodiment, advantageously, a counter-pressure can be reduced, in particular, avoided thereby, by gas discharging downstream of the turbine rotor or its furthest downstream rotating cascade. Additionally or alternatively, the rotating cascade, within particular its blade fastening, which is adjacent downstream of the respective discharge opening, can be cooled advantageously in this way.

In one embodiment, the first space is bounded or defined in the axial direction downstream by a cover fastened to the (turbine) rotor, and, particularly from radially outside in the radial direction, this cover engages over or covers up a downstream front side of the shaft, completely or partially, in particular, over at least 80% of its front surface.

In one embodiment, gas can be guided advantageously into the first space and/or within the first space advantageously thereby.

In one embodiment, the cover can be detached; in particular, it is fastened to the turbine rotor in a friction-fit and/or in a form-fitting manner. In this way, in one embodiment, the mounting can be improved.

In one embodiment, the cover has a particularly central or middle discharge opening and/or assembly opening. In this way, in one embodiment, flow within the first space and/or the assembly can be improved. In another embodiment, the cover is closed.

In one embodiment, the first gas passage communicates with the first space or is joined aerodynamically with the first space thereby via one or more, particularly central, discharge opening(s) in the shaft, in a downstream front side of the shaft. In one embodiment, gas can be guided advantageously into the first space in this way.

In one embodiment, the first space is bounded upstream in the axial direction, in particular, is separated from the second space by a rotor cone, which joins the turbine rotor to the shaft and widens counter to a or to the direction of through-flow of the turbine rotor or converges radially in the direction of through-flow. As stated above, the direction of through-flow is axial from a gas turbine inlet or turbine rotor inlet to a gas turbine outlet or turbine rotor outlet.

In one embodiment, the first space can be enlarged outwardly upstream in the radial direction in this way, so that advantageously, in particular, one or more additional rotating cascade(s) of the first rotor segment can also be supplied with the gas from the first gas passage.

In one embodiment, the second rotor segment has one or more second discharge openings for the discharge of gas from the second space upstream and/or downstream of one or more second rotating cascade(s) and/or upstream of the third rotating cascade, in particular, for the discharge of gas from the second space into the flow channel between two axially adjacent second rotating cascades of the second rotor segment and/or between a second rotating cascade of the second rotor segment and the third rotating cascade. The second discharge openings may involve, for example, an encircling annular gap or also, however, drilled holes.

In one embodiment, advantageously, gas from the second gas passage can be introduced into the flow channel in this way in front of at least one second rotating cascade and perform work there. Additionally or alternatively, the rotating cascade, in particular, its blade fastening, which is adjacent downstream of the respective discharge opening, can be cooled advantageously.

In one embodiment, the first gas passage communicates with a first pressure source, in particular, a first compressor stage of the gas turbine, or is joined aerodynamically to the latter; and the second gas passage communicates with a second pressure source, in particular, a second compressor stage of the gas turbine, or is joined aerodynamically to the latter; wherein this second pressure source has or supplies a higher pressure than the first pressure source, or is provided or furnished for this purpose. The first compressor stage, in particular, can be a low-pressure compressor or part of a low-pressure compressor; the shaft can be correspondingly, in particular, a low-pressure turbine shaft. In one embodiment, advantageously, the different pressure levels of the first and second rotor segments of the turbine rotor can be taken into account thereby.

Alternatively, of course, it is also possible that the first gas passage and the second gas passage communicate with the same pressure source, in particular, a compressor stage of the gas turbine, or are joined aerodynamically therewith, wherein, however, a first supply line, which connects the first gas passage with the common pressure source, is formed in such a way that there is a greater pressure loss in the first supply line than in a second supply line, which connects the second gas passage to the common pressure source. In this way, it is also assured that in the operation of the gas turbine, the pressure in the second gas passage is greater than in the first gas passage.

In one embodiment, if a portion of a boundary surface of the first space, which is rotationally resistant relative to the turbine rotor or is fixed relative to the rotor, amounts to at least 80%, in particular, at least 90%, relative to the overall boundary surface of the first space, the first space can be limited or defined as completely fixed relative to the rotor, in particular, by the first rotor segment, the cover fastened to the rotor, the rotor cone and/or the shaft joined with the turbine rotor, in particular, its downstream front side and/or an outer surface segment of the shaft adjacent to the latter. In one embodiment, gas can be guided advantageously in the first space in this way.

According to one aspect of the present invention, for operating a gas turbine described here or during its operation, the first space is provided with a first flow of gas, in particular a (cooling) air flow, through the first gas passage; and the second space is provided with a second flow of gas, in particular, a (cooling) air flow, through the second gas passage.

In one embodiment, at least 80% of the first gas flow is discharged from the first space through the first discharge openings in at least one operating state, in particular, a designed state and/or a maximum-load operating state. In this way, in one embodiment, advantageously, a large proportion of the gas from the first gas passage can perform work on one or more rotating cascade(s) of the first rotor segment, in particular, after cooling the shaft. Additionally or alternatively, in one embodiment, advantageously, a counter-pressure can be reduced, in particular, avoided in this way, by gas discharged downstream of the turbine rotor or its furthest downstream rotating cascade. Additionally or alternatively, the rotating cascade, in particular its blade fastening, which is adjacent downstream of the respective discharge opening, can be cooled advantageously in this way.

In one embodiment, the first space has a first gas pressure in at least one operating state, in particular, a designed state and/or a maximum-load operating state, and the second space has a second gas pressure that is at least 50 kPa, in particular 100 kPa, higher than the first gas pressure, and/or amounts to at least 400 kPa. In one embodiment, advantageously, the different pressure levels of the first and second rotor segments of the turbine rotor can be taken into account thereby.

BRIEF DESCRIPTION OF THE DRAWING FIGURES

Additional advantageous enhancements of the present invention can be taken from the dependent claims and the following description of preferred embodiments. For this purpose and partially schematized:

FIG. 1 shows a portion of a gas turbine according to an embodiment of the present invention.

DESCRIPTION OF THE INVENTION

FIG. 1 shows a portion of a gas turbine according to one embodiment of the present invention in an axial section.

The gas turbine has a shaft 1 and a bladed turbine rotor 20 joined therewith in a rotationally-resistant and axially-fixed manner.

The turbine rotor 20 has a first rotor segment 21, which has a furthest downstream rotating cascade 23 as well as another rotating cascade 24 distanced in the axial direction (horizontal in FIG. 1), and this rotating cascade 24 is disposed upstream (left in FIG. 1) of the furthest downstream rotating cascade 23.

The turbine rotor 20 has a second rotor segment 22 bounding thereto or axially adjacent upstream of the first rotor segment 21 (left in FIG. 1), and this second rotor segment 22 has in turn at least one second rotating cascade 25 of the turbine rotor.

The first and second rotor segments are separated from one another by a common third rotating cascade 26.

The rotating cascades 23-26 of the bladed turbine rotor are disposed in a common flow channel 3, which is bounded radially inward in the radial direction (vertical in FIG. 1) at least partially by the turbine rotor.

The first rotor segment 21 bounds a first space 41 from radially outside in the radial direction (top in FIG. 1), and this space 41 communicates or is joined aerodynamically to a first gas passage in the form of a first gas passage 51 formed in the shaft 1.

The second rotor segment 22 bounds a second space 42 that is axially adjacent to the first space 41, from radially outside in the radial direction, and this second space 42 communicates aerodynamically with a second gas passage 52 that is aerodynamically separated from the first gas passage 51.

The first rotor segment 21 has several first discharge openings 61 for the discharge of gas from the first space 41 into the flow channel 3 between the furthest downstream rotating cascade 23 and the additional rotating cascade 24 that is axially adjacent to rotating cascade 23, as well as between this additional rotating cascade 24 and the third rotating cascade 26.

The first space 41 is bounded in the axial direction downstream (right in FIG. 1) by a cover 70 fastened to the turbine rotor, and this cover 70 in the radial direction engages over or covers up from radially outside a downstream front side (right in FIG. 1) of shaft 1 over at least 80% of its front surface.

The cover 70 is fastened detachably by screws 71 to the turbine rotor 20 in a friction fit.

The first gas passage 51 communicates aerodynamically with the first space 41 via a central-shaft discharge opening 11 in a downstream front side (right in FIG. 1) of the shaft 1.

The first space 41 is bounded in the axial direction upstream (left in FIG. 1) by a rotor cone 8 and is aerodynamically and structurally separated from the second space 42. The rotor cone 8 joins the turbine rotor 20 to the shaft 1 and widens counter to a direction of through-flow axially, running from a gas-turbine or turbine-rotor inlet to a gas-turbine or turbine-rotor outlet (from left to right in FIG. 1) of the turbine rotor (i.e., converges radially toward the right in FIG. 1).

The second rotor segment 22 has several second discharge openings 62 for the discharge of gas upstream of the second rotating cascade 25 and between this second rotating cascade 25 and the third rotating cascade 26.

The first gas passage 51 communicates aerodynamically with the first compressor stage of the gas turbine; the second gas passage 52 communicates with a second compressor stage of the gas turbine (not shown), which has or supplies a higher pressure than the first compressor stage.

The first space 41 is completely fixed relative to the rotor via the first rotor segment 21, the cover 70 fastened to the rotor, the rotor cone 8, and bounds the shaft 1 joined to the turbine rotor 20, so that the proportion of boundary surface fixed to the rotor of the first space 41 amounts to 100% of its total boundary surface.

During operation, the first space 41 is supplied via the first gas passage 51 with a first flow of cooling air, which is discharged from this first space through the first discharge openings 61 and a vent 63, and the second space 42 is supplied via the second gas passage 52 with a second flow of cooling air, which is discharged from the second space through the second discharge openings 62, as is indicated schematically by arrows depicting flow in FIG. 1. In this case, at least 80% of the first gas flow is discharged from the first space 41 through the first discharge openings 61.

At one operating point, the first space 41 has a first gas pressure of approximately 350 kPa, and the second space has a second gas pressure of approximately 450 kPa.

Although exemplary embodiments were explained in the preceding description, it shall be noted that a plurality of modifications is possible. In addition, it shall be not that the exemplary embodiments only involve examples that in no way shall limit the scope of protection, the applications and the structure. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A gas turbine, comprising:
   a shaft and a bladed turbine rotor joined therewith;
   a first rotor segment, which has a downstream rotating cascade of the bladed turbine rotor and bounds a first space in the radial direction, the first space communicating with a first gas passage disposed in the shaft; and
   a second rotor segment axially adjacent to the first rotor segment, which has at least one second rotating cascade of the bladed turbine rotor and bounds a second space axially adjacent to the first space in the radial direction, this second space communicating with a second gas passage;
   wherein the first rotor segment has at least one discharge opening for the discharge of gas from the first space upstream of the furthest downstream rotating cascade, and
   wherein the first space is bounded downstream in the axial direction by a cover directly fastened to the rotor, this cover engaging over, at least partially, a downstream front side of the shaft in the radial direction.

2. The gas turbine according to claim 1, wherein the cover is fastened detachably to the turbine rotor.

3. The gas turbine according to claim 1, wherein the first gas passage communicates with the first space via the at least one discharge opening in the shaft, in a downstream front side of the shaft.

4. The gas turbine according to claim 1, wherein the first space is bounded upstream in the axial direction by a rotor cone, which joins the turbine rotor to the shaft, and widens, running from an inlet to an outlet of the turbine rotor, counter to a direction of through-flow.

5. The gas turbine according to claim 1, wherein the first rotor segment has at least one additional rotating cascade of the turbine rotor and at least one additional discharge opening for the discharge of gas from the first space upstream or downstream of the additional rotating cascade.

6. The gas turbine according to claim 1, wherein the second rotor segment has at least one second discharge opening for the discharge of gas from the second space upstream or downstream of the second rotating cascade.

7. The gas turbine according to claim 1, wherein the first gas passage communicates with a first pressure source, in particular, a first compressor stage of the gas turbine; and the second gas passage communicates with a second pressure source, in particular, a second compressor stage of the gas turbine, which has a higher pressure than the first pressure source.

8. The gas turbine according to claim 1, wherein a proportion of a boundary surface fixed relative to the rotor, with respect the total boundary surface of the first space, is at least 80%.

9. The gas turbine according to claim 1, wherein the first space is supplied with a first gas flow through the first gas passage, and the second space is supplied with a second gas flow through the second gas passage.

10. The gas turbine according to claim 9, wherein at least 80% of the first gas flow is discharged from the first space through the first discharge openings.

11. The gas turbine according to claim 1, wherein the first space has a first gas pressure and the second space has a second gas pressure, the second gas pressure is at least 50 kPa higher than the first gas pressure or amounts to at least 400 kPa.

\* \* \* \* \*